United States Patent [19]
Ogiso

[11] Patent Number: 5,236,210
[45] Date of Patent: Aug. 17, 1993

[54] SUSPENSION DEVICE FOR STEERING VEHICLE WHEEL WITH ASYMMETRIC TOE-IN BIASING FOR TURNING

[75] Inventor: Satoshi Ogiso, Toyota, Japan

[73] Assignee: Toyota Jidosha Kabushiki Kaisha, Aichi, Japan

[21] Appl. No.: 994,464

[22] Filed: Dec. 21, 1992

Related U.S. Application Data

[63] Continuation of Ser. No. 716,000, Jun. 17, 1991, abandoned.

[30] Foreign Application Priority Data

Jul. 27, 1990 [JP] Japan ................. 2-199882

[51] Int. Cl.$^5$ ............................. B62D 7/16
[52] U.S. Cl. ..................... 280/96.1; 280/661; 280/673; 180/141
[58] Field of Search ............ 280/96.1, 660, 661, 280/691, 673, 675, 716, 91; 180/141

[56] References Cited

U.S. PATENT DOCUMENTS

| | | |
|---|---|---|
| 4,153,272 | 5/1979 | Fiedler et al. |
| 4,706,989 | 11/1987 | Iijima et al. ............... 280/675 |
| 4,717,175 | 1/1988 | Arai et al. ................. 280/96.1 |
| 4,822,073 | 4/1989 | Tanahashi et al. ......... 280/691 |

FOREIGN PATENT DOCUMENTS

| | | |
|---|---|---|
| 2349272 | 4/1974 | Fed. Rep. of Germany. |
| 37167706 | 12/1988 | Fed. Rep. of Germany. |
| 2426585 | 12/1979 | France. |
| 61-75009 | 4/1986 | Japan. |
| 61-129606 | 8/1986 | Japan. |

*Primary Examiner*—Robert J. Oberleitner
*Assistant Examiner*—Paul Dickson
*Attorney, Agent, or Firm*—Oliff & Berridge

[57] ABSTRACT

In a suspension device for a steering vehicle wheel in a vehicle in which a lower portion of a carrier for rotatably supporting the steering vehicle wheel is supported by a lower arm pivotably connected with the carrier at its outboard end and pivotably connected with a vehicle body at its inboard end, the lower arm is biased in a running turn of the vehicle so that its outboard end is shifted rearward when the vehicle wheel is at the outside of the turn and forward when the vehicle wheel is at the inside of the turn under the control 8 a steering direction detecting means.

6 Claims, 3 Drawing Sheets

SUSPENSION DEVICE FOR STEERING VEHICLE WHEEL WITH ASYMMETRIC TOE-IN BIASING FOR TURNING

This is a continuation of application Ser. No. 07/716,000 filed Jun. 17, 1991, now abandoned.

BACKGROUND OF THE INVENTION

1. Field of the Invention

The present invention relates to a suspension device in a vehicle such as an automobile, and more particularly to an improvement of the suspension device for a steering vehicle wheel with respect to the stability of the vehicle in the running turn.

2. Description of the Prior Art

As described in, for example, Japanese Utility Model Laid-open Publication 61-129606, there is known as a type of the suspension device for a steering vehicle wheel in a vehicle such as an automobile a suspension device which comprises a carrier for supporting the vehicle wheel to be rotatable about an axis of rotation, and a lower arm pivotably connected with said carrier at an outboard end thereof and pivotably connected with a vehicle body at two inboard end portions thereof spaced from one another in a substantially longitudinal direction of the vehicle via rubber bushes, wherein the rear side mounting point of the lower arm is pushed outboard in the braking of the vehicle by utilizing a hydraulic pressure available for operating the braking system of the vehicle.

In this suspension device, as the rear side mounting point of the lower arm is pushed outboard in the braking of the vehicle, the lower arm is turned about the forward mounting point thereof so as to shift the vehicle wheel in the direction of toeing in, so that the shifting of a vehicle wheel in the direction of toeing out during braking of the vehicle due to a turning of the lower arm under a compression of the rubber bushes is decreased or cancelled thus improving the stability of the vehicle in running straight forward while braking.

However, in the suspension device of the above-mentioned construction no improvement of the stability of the vehicle is yet available in the running turn of the vehicle. As well known in the art, it is desirable from the view point of improving the stability of the vehicle in the running turn that the king pin offset is small. However, in the suspension device of the above-mentioned construction, the king pin offset is not decreased when the vehicle turns during braking. Therefore, the stability of the vehicle in the running turn during braking is not improved in relation with the king pin offset.

It would be contemplated in the suspension device of the above-mentioned construction to positively bias the lower arm about the front mounting point thereof in the direction of toeing in the vehicle wheel in the running turn of the vehicle. In such a modification, however, the lower arms for the left and right vehicle wheels are all biased in the direction of toeing in the vehicle wheels. Therefore, in the vehicle wheel at the outside of the turn, the king pin offset is decreased. However, in the vehicle wheel at the inside of the turn, the king pin offset is increased. This would deteriorate the stability of the vehicle in the running turn, particularly in the transition thereto and therefrom.

SUMMARY OF THE INVENTION

In view of the above-mentioned problems in a conventional suspension device such as described in the above-mentioned Japanese Utility Model Laid-open Publication 61-129606, it is the object of the present invention to provide a suspension device for a steering vehicle wheel which is improved with respect to the stability of the vehicle in the transition to and from the running turn.

According to the present invention, the above-mentioned object is accomplished by a suspension device for a steering vehicle wheel in a vehicle, comprising a steering direction detecting means, a carrier for supporting a vehicle wheel to be rotatable about an axis of rotation thereof, a lower arm pivotably connected with said carrier at an outboard end thereof and pivotably connected with a vehicle body at an inboard end thereof, and a biasing means for biasing the outboard end of said lower arm in a substantially longitudinal direction of the vehicle, wherein said biasing means biases the outboard end of said lower arm substantially rearward with respect to the vehicle for a vehicle wheel at the outside of a turn and biases the outboard end of said lower arm substantially forward with respect to the vehicle for a vehicle wheel at the inside of a turn according to a signal received from said steering direction detecting means.

According to the above-mentioned construction, the outboard end of the lower arm is biased substantially rearward with respect to the vehicle by the biasing means for the vehicle wheel at the outside of the turn, whereas the outboard end of the lower arm is biased substantially forward with respect to the vehicle for the vehicle wheel at the inside of the turn. In turning the vehicle the carrier for the vehicle wheel at the outside of the turning is turned about the outboard end of the lower arm in the direction of toeing in the vehicle wheel, whereas the carrier for the vehicle wheel at the inside of the turn is turned about the outboard end of the lower arm in the direction of toeing out the vehicle wheel. Therefore, in the transition to and from turning the carrier for the vehicle wheel at the outside of the turn is turned about the outboard end of the lower arm in the direction of toeing in the vehicle wheel with the lower arm being shifted rearward with respect to the vehicle, whereas the carrier for the vehicle wheel at the inside of the turn is turned about the outboard end of the lower arm in the direction of toeing out the vehicle wheel with the lower arm being shifted forward with respect to the vehicle.

Therefore, the instant center of a lower portion of the carrier is shifted outboard from the outboard end of the lower arm within the range on the inboard side of the center plane of the wheel for both of the vehicle wheels at the outside and the inside of the turn, whereby a lower portion of the king pin axis is shifted outboard so as to decrease the king pin offset, thus improving the stability of the vehicle in and in the transition to and from the turning.

In the above-mentioned suspension device, said biasing means may comprise a rubber bush means having an inner void adapted to be supplied with a fluid pressure therein and to generate a more eccentric deformation in a first direction as the pressure in said inner void is increased from a normal pressure and a more eccentric deformation in a second direction opposite to said first direction as the pressure in said inner void is lowered from said normal pressure.

Further, in the above-mentioned suspension device, said steering direction detecting means may comprise a cylinder and piston assembly in which said piston is shifted relative to said cylinder in a first relative direction according to a steering operation of the vehicle for a right turn and in a second relative direction opposite to said first relative direction according to a steering operation of the vehicle for a left turn, said cylinder having a first fluid pressure delivery port for delivering a fluid pressure which rises from said normal pressure when said piston is shifted relative to said cylinder in said first relative direction and lowers from said normal pressure when said piston is shifted relative to said cylinder in said second relative direction, the fluid pressure delivered from said first fluid pressure delivery port being supplied to said inner void of said rubber bush means.

In the above-mentioned suspension device, when the vehicle has a rack and pinion steering assembly for steering the steering vehicle wheel, one of said cylinder and said piston may be connected with said rack while the other of said cylinder and said piston may be connected with the vehicle body.

Further, in the above-mentioned suspension device, a pair of said rubber bush means may be provided for a pair of steering vehicle wheels with said inner void in each said rubber bush means being oriented to be symmetrical to one another relative to a longitudinal axis of the vehicle, and said cylinder may have a second fluid pressure delivery port for delivering a fluid pressure which lowers from said normal pressure when said piston is shifted relative to said cylinder in said first relative direction and rises from said normal pressure when said piston is shifted relative to said cylinder in a second relative direction opposite to said first relative direction, the fluid pressure delivered from said first fluid pressure delivery ports being supplied to said inner void of a first one of said pair of rubber bush means, the fluid pressure delivered from said second fluid pressure delivery ports being supplied to said inner void of a second one of said pair of rubber bush means.

In the above-mentioned suspension device, said lower arm may be substantially L-shaped having two points of said pivotable connection with the vehicle body spaced from one another in a substantially longitudinal direction of the vehicle so that a shifting of a first one of said two points in a substantially transverse direction with respect to the vehicle turns said pivotable connection thereof with said carrier about a second one of said two points so as to shift in a substantially longitudinal direction with respect to the vehicle, and said biasing means biases said first point in a substantially transverse direction with respect to the vehicle.

BRIEF DESCRIPTION OF THE DRAWINGS

In the accompanying drawings.

DESCRIPTION OF THE PREFERRED EMBODIMENT

In the following, the present invention will be described in more detail with respect to an embodiment thereof.

Figure 1:
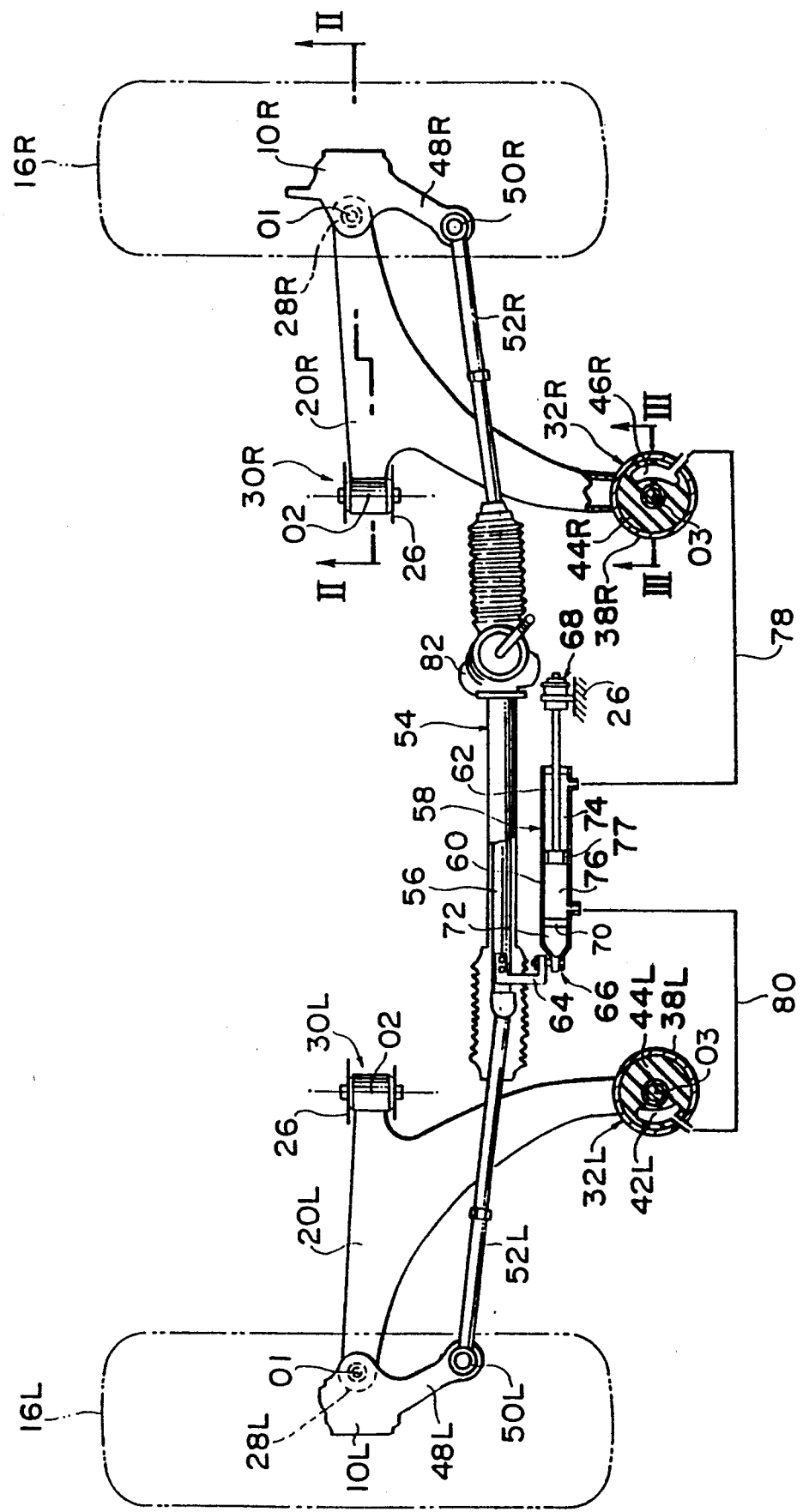
FIG. 1 is a schematic plan view of an embodiment of the steering suspension device according to the present invention constructed as a double wishbone type suspension device for front vehicle wheels.
Figure 2:
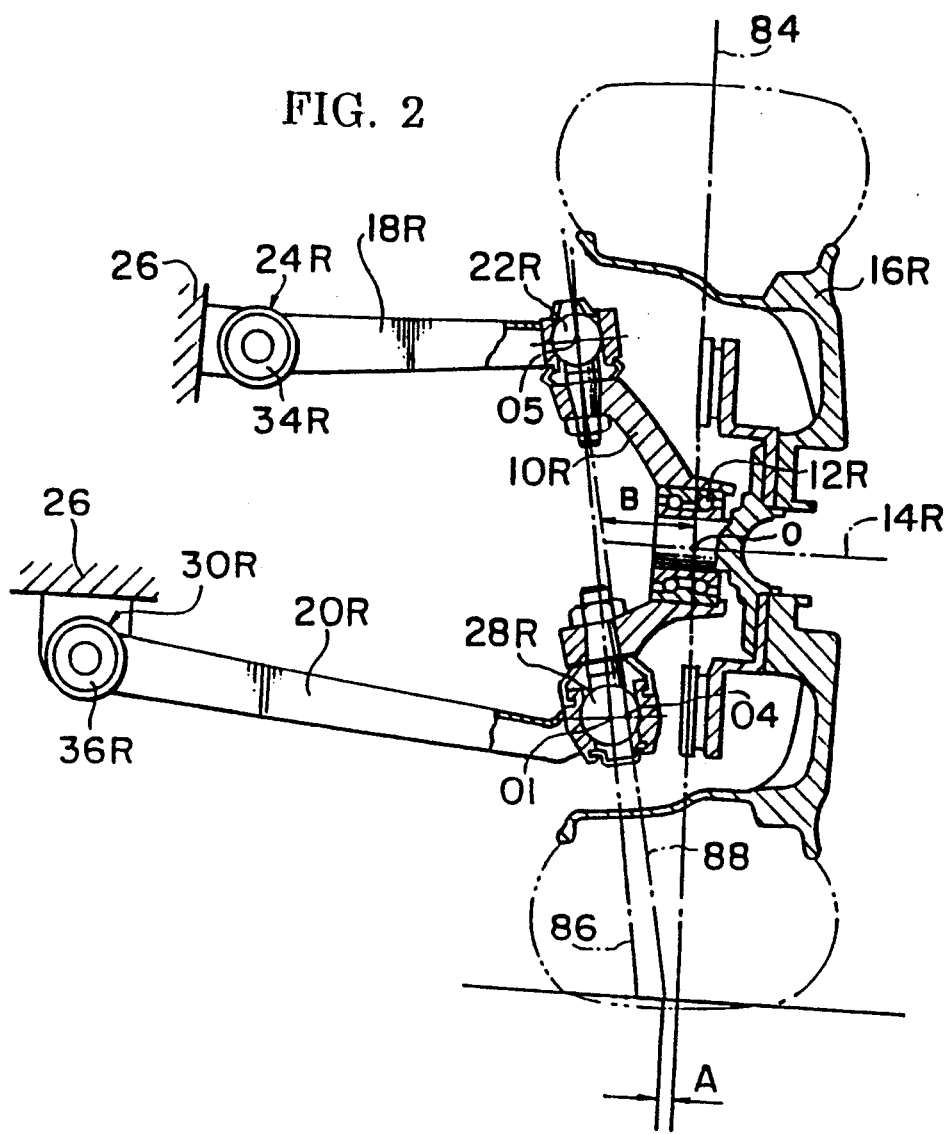
FIGS. 2 and 3 are somewhat enlarged sectional views along lines II—II and III—III in FIG. 1, respectively.
Figure 3:
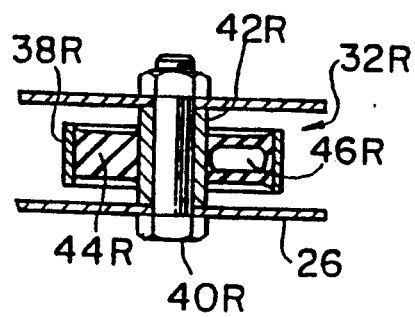

In FIGS. 1 and 2, some conventional structures such as a shock absorber and a suspension spring are omitted from the illustration. Further, in FIG. 1 an upper arm is also omitted from the illustration. In FIGS. 1-3 the corresponding parts for the right front wheel and the left front wheel are designated by the same reference numerals with the addition of R and L, respectively.

Referring to FIGS. 1 and 2, 10R is a carrier for supporting a right front wheel 16R to be rotatable about an axis of rotation 14R by way of a bearing 12R. 18R and 20R are an upper arm and a lower arm, respectively. The upper arm 18R is a so-called A-type arm having an outboard end pivotably connected with an upper end of the carrier 10R by a ball joint 22R and two inboard ends spaced from one another in the longitudinal direction of the vehicle and pivotably connected with a vehicle body 26 by a pair of bush means 24R. The lower arm 20R is substantially L-shaped and has an outboard end pivotably connected with a lower end of the carrier 10R by a ball joint 28R and two inboard ends spaced from one another in the longitudinal direction of the vehicle pivotably connected with the vehicle body 26 by bush means 30R and 32R, respectively.

In the shown embodiment, the bush means 24R and 30R each have an axis extending in a substantially longitudinal direction of the vehicle and include cylindrical rubber bush elements 34R and 36R, respectively. In contrast, the bush means 32R has a substantially vertically extending axis and comprises an outer sleeve 38R fixed to the rear inboard end of the lower arm 20R, an inner sleeve 42R firmly mounted to the vehicle body 26 by a bolt-nut assembly 40R, and a rubber bush element 44R elastically mounted between the outer sleeve and the inner sleeve. The rubber bush element 44R has an inner void 46R at a portion thereof located on the outboard side of the inner sleeve 42R. Outer sleeve 38R as a center point O3 that, during straight running, may correspond to the axis of bolt-nut assembly 40R.

As shown in FIG. 1, the carrier 10 has a knuckle arm 48R formed to be integral therewith and extending rearward therefrom, the tip end thereof being pivotably connected with a tie rod 52R by a ball joint 50R. The other end of the tie rod 52R is, in the shown embodiment, pivotably connected with a corresponding end of a rack bar 56 of a rack and pinion type steering device 54.

The left front wheel is supported by a suspension construction similar to that described above. Therefore, a detailed description for the left front wheel will be omitted.

As shown in FIG. 1, a steering damper 58 is provided adjacent the steering device 54. The steering damper 58 comprises a cylinder 60 and a piston 62 engaged in said cylinder to be movable therein for reciprocation. One end of the cylinder 60 is connected with a bracket 64 by a bush means 66, said bracket 64 being mounted to the rack bar 56. A rod portion of the piston 62 extends through another end of the cylinder 60 so that its outer end is connected with the vehicle body 26 by a bush means 68. A free piston 70 is received in the cylinder 60 so as to define a gas chamber 72 at one end of the cylinder. The piston 62 defines two cylinder chambers 74 and 76 in the cylinder 60 in addition to gas chamber 72. The piston 62 has an orifice 77 communicating the two cylinder chambers with one another. The cylinder chambers 74 and 76 are connected with the inner voids 46R and 46L in the bush means 32R and 32L by conduit means 78 and 80, respectively.

As is well known in the art, in a running turn of the vehicle a rotational movement of a steering wheel (not shown in the figure) is transmitted to the rack bar 56 so that it is shifted transversely left and right as viewed in FIG. 1. Such a movement of the rack bar 56 is transmitted to the carriers 10R and 10L by way of the tie rods 52R and 52L and the knuckle arms 48R and 48L, respectively, so that the vehicle wheels 16R and 16L are steered accordingly. In such steering movements, particularly referring to the lower portions of the carriers 10R and 10L, they pivot about the center points O1 of the ball joints 28R and 28L relative to the lower arms 20R and 20L, respectively.

At the same time, the cylinder 60 of the steering damper 58 is moved relative to the piston 62 as driven by the rack bar 56 by way of the bracket 64. When the vehicle makes a left turn, the cylinder 60 is shifted rightward in the figure, whereby the pressure in the cylinder chamber 74 lowers, and the pressure in the cylinder chamber 76 rises. The pressures in the cylinder chambers 74 and 76 are transmitted to the inner voids 46R and 46L of the bush means 32R and 32L through the conduits 78 and 80, respectively, to displace center point O3. Therefore, the lower arm 20R for the right front vehicle wheel at the outside of the turn is turned about the center point O2 of the front bush means 30R in the clockwise direction as viewed in FIG. 1, so that the ball joint 28R is shifted substantially rearward, whereas the lower arm 20L for the left front wheel is turned about the center point O2 of the bush means 30L in the clockwise direction as viewed in FIG. 1, so that the ball joint 28L is shifted substantially forward. The amounts of such turning of the lower arms correspond to the amount of the steering, particularly the speed of the steering. In a right turn of the vehicle an operation similar to that described above, but in the opposite direction occurs.

Thus, the steering damper 58 operates as a means for detecting the direction and the amount of a turning of the vehicle, and the combination of the steering damper 58 and the bush means 32R and 32L operates as a means for biasing the outboard ends of the lower arms substantially forward or rearward with respect to the vehicle.

Next, the movement of the carrier in the transition to and from the left turn while increasing and decreasing the steering angle, respectively, will be described with reference to the diagrams shown in FIGS. 4 and 5. In these figures, the solid lines show the positions of the respective parts during straight running of the vehicle. The broken lines show the corresponding parts during a left turn of the vehicle.

Figure 4:
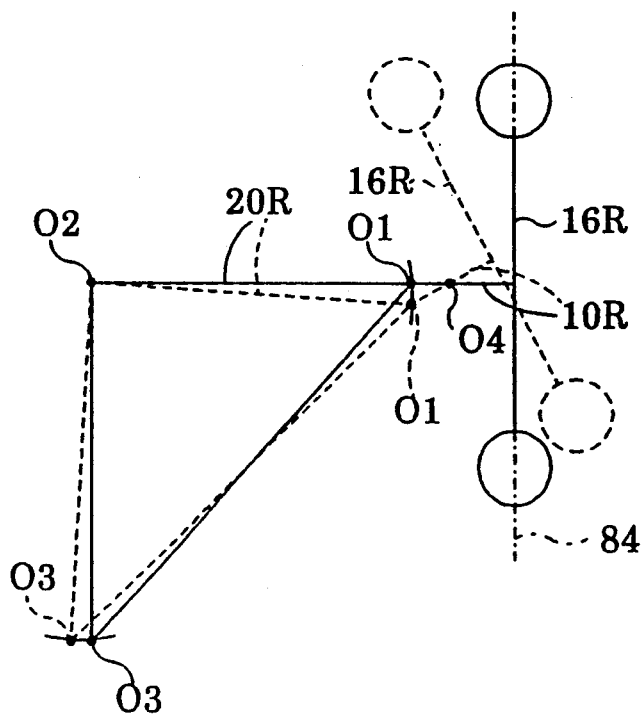
FIGS. 4 and 5 are diagrammatical illustrations in a plan view of the suspension device for the right front wheel and the left front wheel in the transition to and from a left turning of the vehicle, respectively.

As shown in FIG. 4, in the right front vehicle wheel, as the lower arm 20R turns about the center point O2 in the clockwise direction as viewed in the figure, the center point O1 of the ball joint 28R at the outboard end of the lower arm shifts substantially rearward. Therefore, when the carrier 10R is turned about the center point O1 in the counter-clockwise direction as viewed in the figure for the left turn, it is turned about the center point O1 which is shifting substantially rearwardly. As a result, the carrier 10R turns substantially about a point of intersection O4 relative to the vehicle body.

Figure 5:
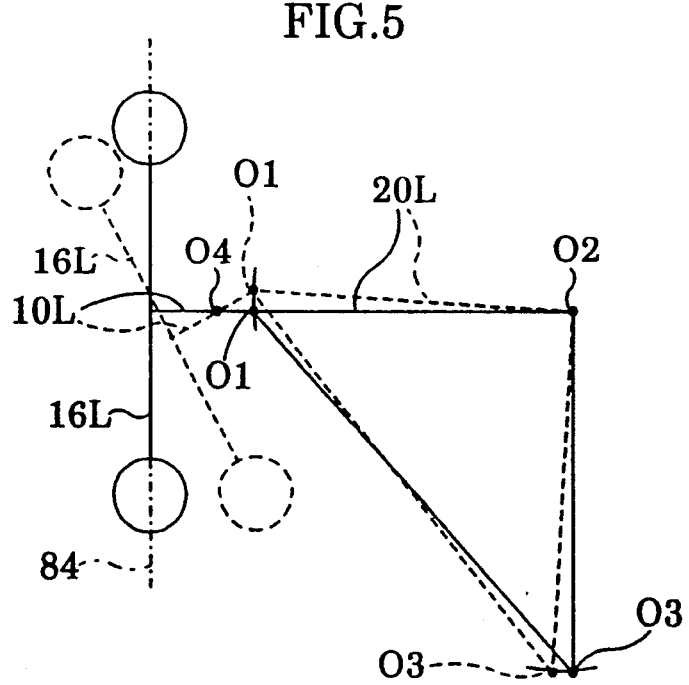

On the other hand, as shown in FIG. 5, in the left front vehicle wheel, as the lower arm 20L turns about the center point O2 in the clockwise direction as viewed in the figure, the center point O1 of the ball joint 28L at the outboard end of the lower arm shifts substantially forward. Therefore, when the carrier 10L turns about the center point O1 in the counter-clockwise direction as viewed in the figure for the left turn, it is turned about the center point O1 which is shifting substantially forward. As a result, the carrier 10L turns substantially about a point of intersection O4 relative to the vehicle body.

Therefore, as shown in FIG. 2 with respect to the right front wheel, the king pin axis is provided, not by a straight line 86 passing through the center point O5 of the ball joint 22R at the outboard end of the upper arm and the center point O1 of the ball joint 28R, but by a straight line 88 passing through the center point O5 and the point of intersection O4. As shown in FIGS. 4 and 5, the point of intersection O4 is located on the inboard side of the center plane 84 of the vehicle wheel and the outboard side of the center point O1. Therefore, as shown in FIG. 2, the king pin offset A is smaller when it is provided by the straight line 88 than being provided by the straight line 86. Therefore, the stability of the vehicle in the running turn is improved.

Further, as shown in FIG. 2, the horizontal distance B between the point of intersection O of the axis of rotation 14R with the center plane 84 and the king pin axis 88 is smaller than in the case where the king pin axis is provided by the straight line 86. Therefore, the flutter is decreased, whereby the torque steer and the tuck-in are decreased when the steering vehicle wheel is a driving vehicle wheel.

Although the embodiment described in the above is constructed as a double wishbone type suspension device, the present invention may be applied to any type of suspension device provided that it comprises a carrier for rotatably supporting a vehicle wheel and a lower arm pivotably connected with the carrier at an outboard end thereof and pivotably connected with a vehicle body at an inboard end thereof, like a strut type suspension device. Further, although the direction of the running turn of the vehicle is detected by the pressure in the cylinder of the steering damper and the amount of biasing the outboard end of the lower arm in the forward or rearward direction is controlled according to the amount of change of the pressure in the cylinder in the embodiment described above, the direction of the running turn of the vehicle may be detected by a steering angle sensor, and the amount of biasing the outboard end of the lower arm in the forward or rearward direction may be controlled by the pressure in the inner voids 46R and 46L of the bush means 32R and 32L being controlled by an electronic means according to the steering angle, the angular velocity of steering, etc.

Although the invention has been described in detail with respect to a particular embodiment thereof, it will be apparent for those skilled in the art that various modifications are possible without departing from the scope of the present invention.

I claim:

1. A suspension device for a steering vehicle wheel in a vehicle, comprising:

a carrier for supporting a steering vehicle wheel to be rotatable about an axis of rotation thereof;

a lower arm pivotally connected with said carrier at an outboard end thereof for permitting a steering turn of the vehicle wheel about a steering pivot point of the pivotal connection therebetween and pivotally connected with a vehicle body at an inboard end thereof, said steering pivot point between the outboard end of the lower arm and the carrier for a steered turn of the vehicle wheel being positioned to be substantially distant from a center line of the steering vehicle wheel on an inboard side thereof;

a steering means for turning the steering vehicle wheel about said steering pivot point between the outboard end of the lower arm and the carrier; and a biasing means for biasing the outboard end of said lower arm in a substantially longitudinal direction of the vehicle in relation to a steering of the steering vehicle wheel by said steering means about said steering pivot point between the outboard end of the lower arm and the carrier, wherein said biasing means biases the outboard end of the lower arm substantially rearward with respect to the vehicle body for the steering vehicle wheel at the outside of a turn of the vehicle along with an increase of the steering turn of the steering vehicle wheel by said steering means about said steering pivot point between the outboard end of the lower arm and the carrier and biases the outboard end of said lower arm substantially forward with respect to the vehicle body for the steering vehicle wheel at the inside of the turn of the vehicle along with an increase of the steering turn of the steering vehicle wheel by said steering means about said steering pivot point between the outboard end of the lower arm and the carrier.

2. A suspension device according to claim 1, wherein said biasing means comprises a rubber bush means having an inner void adapted to be supplied with a fluid pressure therein and to generate a more eccentric deformation in a first direction as the pressure in said inner void is increased from a normal pressure and a more eccentric deformation in a second direction opposite to said first direction as the pressure in said inner void is lowered from said normal pressure.

3. A suspension device according to claim 2, wherein said biasing means comprises a cylinder and a piston in an assembly in which said piston is shifted relative to the cylinder in a first relative direction according to a steering operation of the vehicle for a right turn and in a second relative direction opposite to said first relative direction according to a steering operation of the vehicle for a left turn, said cylinder having a first fluid pressure delivery port for delivering a fluid pressure which rises from a normal pressure when said piston is shifted relative to said cylinder in said first relative direction and lowers from said normal pressure when said piston is shifted relative to said cylinder in said second relative direction, the fluid pressure delivered from said first fluid pressure delivery port being supplied to said inner void of said rubber bush means.

4. A suspension device according to claim 3, wherein the vehicle has a rack and pinion steering assembly for steering the steering vehicle wheel, and a one of said cylinder and said piston is connected with said rack while the other of said cylinder and said piston is connected with the vehicle body.

5. A suspension device according to claim 3, wherein one rubber bush means is provided for each steering vehicle wheel with said inner void in each said rubber bush means being oriented to be symmetrical to one another relative to a longitudinal axis of the vehicle, and said cylinder has a second fluid pressure delivery port for delivering a fluid pressure which lowers from said normal pressure when said piston is shifted relative to the cylinder in said first relative direction and rises from said normal pressure when said piston is shifted relative to the cylinder in said second relative direction opposite to said first relative direction, the fluid pressure derived from said first fluid pressure delivery port being supplied to said inner void of a first one of said rubber bush means, the fluid pressure delivered from said second fluid pressure delivery port being supplied to said inner void of a second one of said rubber bush means.

6. A suspension device according to claim 1, wherein said lower arm is substantially L-shaped having two points of said pivotal connection with the vehicle body spaced from one another in a substantially longitudinal direction of the vehicle so that a shifting of a first one of said two points in a substantially transverse direction with respect to the vehicle turns said pivotal connection thereof with said carrier about a second one of said two points so as to shift in a substantially longitudinal direction with respect to the vehicle, and said biasing means biases said first point in a substantially transverse direction with respect to the vehicle.

* * * * *